US006961307B1

(12) United States Patent
Aweya et al.

(10) Patent No.: US 6,961,307 B1
(45) Date of Patent: Nov. 1, 2005

(54) QUEUE MANAGEMENT MECHANISM FOR PROPORTIONAL LOSS RATE DIFFERENTIATION

(75) Inventors: James Aweya, Nepean (CA); Michel Ouellette, Rockland (CA); Delfin Y. Montuno, Kanata (CA)

(73) Assignee: Nortel Networks Limited, St. Laurent ( * ) Notice: Subject to any disclaimer, the term of this patent is extended or adjusted under 35 U.S.C. 154(b) by 978 days.

(21) Appl. No.: 09/900,146

(22) Filed: Jul. 9, 2001

Related U.S. Application Data

(63) Continuation-in-part of application No. 09/455,445, filed on Dec. 6, 1999, now Pat. No. 6,690,645.

(51) Int. Cl.[7] .............................................. H04L 12/26
(52) U.S. Cl. ...................................... 370/230; 370/412
(58) Field of Search ............................. 370/230, 230.1, 370/412, 415, 417

(56) References Cited

U.S. PATENT DOCUMENTS

| | | | |
|---|---|---|---|
| 6,463,068 B1 * | 10/2002 | Lin et al. | 370/414 |
| 6,675,220 B1 * | 1/2004 | Bergamasco et al. | 709/232 |
| 6,744,767 B1 * | 6/2004 | Chiu et al. | 370/395.21 |
| 6,813,243 B1 * | 11/2004 | Epps et al. | 370/235 |
| 6,829,224 B1 * | 12/2004 | Goldman et al. | 370/252 |
| 2003/0225903 A1 * | 12/2003 | Lodha | 709/232 |

OTHER PUBLICATIONS

C. Dovrolis and P. Ramanathan, "A Case for Relative Differentiated Services and the Proportional Differentiated Model", IEEE Network, Sep./Oct. 1999, pp. 26-34.
C. Dovrolis, D. Stilliadis, and P. Ramanathan, "Proportional Differentiated Service: Delay Differentiation and Packet Scheduling". Proc. ACM SIGCOMM'99, 1999, pp. 109-120.
C. Dovrolis and D. Stilliadis, "Relative Differentiated Service in the Internet: Issues and Mechanisms", Proc. ACM SIGMETRICS'99, 1999.
C. Dovrolis and P. Ramanathan, "Proportional Differentiated Services, Part II: Loss rate Differentiation and Packet Dropping", Proc. 2000 Int. Workshop on Quality of Service (IWQoS), Pittsburg PA, Jun. 2000.
S. Floyd and V. Jacobson, "Random Early Detection Gateways for Congestion Advoidance", IEEE/ACM Trans. Networking, vol. 1, No. 4, Aug. 1993, pp. 397-413.
B. Braden, D. Clark, J. Crowcroft, B. Davie, D. Estrin, S. Floyd, V. Jacobson, G. Minshall, C. Partridge, L. Peterson, K. K. Ramakrishnan, S. Shenker, J. Wroclawski, L. Zhang, "Recommendations on Queue Management and Congestion Advoidance in the Internet", IETF RFC 2309, Apr. 1998.
S. Blake et al., "An Architecture for Differentiated Services", IETF RFC 2475, Dec. 1998.
G. F. Franklin, J. D. Powell and A. Emami-Naeini, "Feedback Control of Dynamic Systems", Addison-Wesley Reading, Massachusetts, 1994.

* cited by examiner

*Primary Examiner*—Melvin Marcelo
(74) *Attorney, Agent, or Firm*—Hunton & Williams LLP

(57) ABSTRACT

A technique for managing a queue so as to distribute losses among different service classes is disclosed. In one embodiment, the technique is realized by classifying an incoming packet into one of a plurality of classes. Each class has an associated weighting factor. The system continuously monitors a queue size and determines an overall packet drop probability based on the actual queue size and a target queue size and calculates a target class drop probability based on the overall packet drop probability and the weighting factor. Finally, the system makes a comparison based on the target class drop probability and a selected value and decides whether to drop the incoming packet based on a result of the comparison. If losses are unavoidable in the system, the technique ensures that the losses will be distributed among the different service classes in inverse proportion to the service price of each class.

22 Claims, 9 Drawing Sheets

QUEUE MANAGEMENT MECHANISM FOR PROPORTIONAL LOSS RATE DIFFERENTIATION

CROSS-REFERENCE TO RELATED APPLICATIONS

This patent application is a Continuation-In-Part application of U.S. patent application Ser. No. 09/455,445, filed on Dec. 6, 1999 now U.S. Pat. No. 6,690,645, which is hereby incorporated by reference herein in its entirety.

FIELD OF THE INVENTION

The present invention relates generally to strategic distribution of losses within a network and, more particularly, to a technique for distributing losses based on service class when such losses are unavoidable in a network.

BACKGROUND OF THE INVENTION

In the present state of the art, the transformation of the Internet into an important and ubiquitous commercial infrastructure has not only created rapidly rising bandwidth demand but also significantly changed consumer expectations in terms of performance, security, and services. Consequently, service providers need to not only evolve their networks to higher and higher speeds, but also need to plan for the introduction of new services and mechanisms so as to address the varied requirements of different customers. At the same time service providers would like to maximize the sharing of the costly backbone infrastructure in a manner that enables them to control usage of network resources in accordance with service pricing and revenue potential. The two trends of rapidly rising bandwidth demand and rising need for differentiation have resulted in efforts to define mechanisms for service differentiation.

Internet applications and users have very diverse quality of service expectations, making the "best-effort" service (or the same-service-to-all) model of the current Internet inadequate and limiting. The prevalent Internet "best-effort" service model does not permit users to obtain better service, no matter how critical their requirements are, and no matter how much they are willing to pay for better service. Clearly, with the increased use of the Internet for commercial purposes, this model of no differentiation is not satisfactory since the service providers do not have the means to meet an existing market demand. There is a widespread consensus today that the Internet architecture has to be extended with service differentiation mechanisms so that certain users and applications can get better service than others at a higher cost.

"Best efforts" may be sufficient in some instances with appropriate provisioning. Nevertheless, some form of differentiation is still desirable. When there is a focused overload to part of a network (such as when a popular web site is heavily accessed, or an unexpected event occurs) the network devices (e.g., switches, routers) have no mechanisms to treat different customers differently. When such events occur, insufficient resources are available for providing reasonable service to all users. Over-provisioning network bandwidth and keeping the network lightly loaded in order to support differentiated services for select customers is not a cost-effective solution, and cannot be achieved at all times.

As a result, from the network device perspective, tools have been developed for providing differentiated services based on the several operations. Packet classification tools can distinguish packets and group them according to their different requirements. Buffer management techniques determine how much buffer space should be given to certain kinds of network traffic and which packets should be discarded in case of congestion. Packet scheduling techniques decide the packet service order so as to meet the bandwidth and delay requirements of different types of traffic.

Some mechanisms for delay and loss rate differentiation have recently been proposed in:

[1]. C. Dovrolis and P. Ramanathan, "A Case for Relative Differentiated Services and the Proportional Differentiated Model," *IEEE Network*, Sept./October 1999, pp. 26–341

[2]. C. Dovrolis, D. Stilliadis, and P. Ramanathan, "Proportional Differentiated Service: Delay Differentiation and Packet Scheduling," *Proc. ACM SIGCOMM'99*, 1999, pp. 109–120;

[3]. C. Dovrolis and D. Stilliadis, "Relative Differentiated Service in the Internet: Issues and Mechanisms," *Proc. ACM SIGMETRICS'99*, 1999; and

[4]. C. Dovrolis and P. Ramanathan, "Proportional Differentiated Services, Part II: Loss rate Differentiation and Packet Dropping," *Proc. 2000 Int. Workshop on Quality of Service* (IWQoS), Pittsburg Pa., June 2000.

A deficiency of the above-mentioned systems is that they fail to take active queue management into consideration which is needed to effectively manage queues in TCP/IP networks. Active queue management schemes include RED (random early detection) as proposed in:

[5]. S. Floyd and V. Jacobson, "Random Early Detection Gateways for Congestion Avoidance," *IEEE/ACM Trans. Networking*, Vol. 1, No. 4, August 1993, pp. 397–413; and

[6]. B. Braden, D. Clark, J. Crowcroft, B. Davie, D. Estrin, S. Floyd, V. Jacobson, G. Minshall, C. Partridge, L. Peterson, K. K. Ramakrishnan, S. Shenker, J. Wroclawski, L. Zhang, "Recommendation on Queue Management and Congestion Avoidance in the Internet," *IETF RFC 2309*, April 1998.

The RED technique aims to detect incipient congestion early and to convey congestion notification to the endsystems, allowing them to reduce their transmission rates before queues in the network overflow and packets are dropped. The basic RED scheme (and its newer variants) maintains an average of the queue length which it uses together with a number of queue thresholds to detect congestion. RED schemes drop incoming packets in a random probabilistic manner where the probability is a function of recent buffer fill history. The objective is to provide a more equitable distribution of packet loss, avoid the synchronization of flows and at the same time improve the utilization of the network.

In a relative differentiated service model, all traffic is grouped into N classes of service. For each class i, the service provided to class i will be better (or at least no worse) than the service provided to class (i−1), where $1 < i \leq N$, in terms of local (per-hop) performance measures of queuing delays and packet losses. This model is discussed in references [1], [2], and [3] identified above. The "or at least no worse" clause is included for levels of low network activity where all classes experience the same quality of service. In this model, an application can select its Class Per-Hop Behavior (CPHB), as defined by the Internet Engineering Task Force (IETF), to select the appropriate level of service. However, this level of service is relative to the other classes in the network and is not an absolute guarantee (such as an end-to-end delay bound or bandwidth), since there is no admission control and resource reservation. The relative differentiated services model assures that the performance of the selected class will be relatively better than the performance of lower classes in the network.

Two principles have been proposed in order for the relative differentiated service model to be effective for both users and network operators. First, a model must be predictable, such that the differentiation is consistent (a higher class is better or at least no worse than a lower class) and the differentiation is independent of class loads. Second, the model must be controllable, such that the network operators can select the appropriate level of spacing between the classes based on their pricing or policy criteria. From these two principles, the proportional differentiation model was proposed. The premise of the proportional differentiation model is that the performance measures for packet forwarding at each hop are ratioed proportionally via the use of class differentiation parameters. Two schemes, Backlog Proportional Rate (BPR) and Waiting-Time Priority (WTP) scheduling were proposed for applying the proportional differentiation model to packet delay. The BPR and WTP schedulers can be applied to delay-sensitive applications such as IP-telephony and video-conferencing.

The aforementioned references, proposed a proportional loss dropper that uses the notion of a loss history buffer (LHB) which captures the loss information for the last K packets received. This loss dropper is invoked during buffer overflow and selects a class to drop packets based on the distance of the class from the normalized loss rates of the other classes. This loss dropper can be used in conjunction with the BPR and WTP schedulers to achieve differentiation according to both loss as well as delay.

The proportional differentiation model disclosed in the aforementioned references, provides a way to control the quality spacing between classes locally at each hop, independent of the class loads. According to this model, certain forwarding performance metrics are ratioed proportionally to the class differentiation parameters that the network operator chooses, leading to controllable service differentiation. Resource management, specifically, buffer management in network devices involve both dimensions of time (packet scheduling) and buffer space (packet discarding). Consequently, queuing delay and packet loss are two performance measures that can be used for proportional service differentiation.

Where $\bar{l}_i$ is the average loss rate for class i, the proportional differentiation model, in the case of packet drops, requires that the class loss rates are spaced as $$\frac{\bar{l}_i}{\bar{l}_j} = \frac{\sigma_i}{\sigma_j}, \quad 1 \le i, j \le N \qquad (1)$$

The parameters $\sigma_i$, are the loss rate differentiation parameters and they are ordered as $\sigma_1 > \sigma_2 > \ldots > \sigma_N > 0$. In this model, higher classes have better performance in terms of loss rates. The loss rate differentiation parameters $\sigma_1 > \sigma_2 > \ldots > \sigma_N > 0$ provide the network operator with tuning knobs for adjusting the quality spacing between classes, independent of the class loads. When this spacing is feasible in short time scales, it can lead to predictable and controllable class differentiation, which are two important features for any relative differentiation model.

The present state of the art fails to propose a loss rate differentiation mechanism designed around an active queue management scheme to determine both when a packet should be dropped and from what class the packet should be dropped.

In view of the foregoing, it would be desirable to provide a technique for strategic distribution of losses within a network which overcomes the above-described inadequacies and shortcomings. More particularly, it would be desirable to provide a technique for distributing losses based on service class when such losses are unavoidable in a network in an efficient and cost effective manner.

SUMMARY OF THE INVENTION

According to the present invention, a technique for strategic distribution of losses within a network is provided. In one embodiment, the technique is realized by a method for managing a queue to control loss distribution based on service class. The method comprises the steps of: classifying each incoming packet into one of a plurality of classes, each class having an associated weighting factor; monitoring a queue size; determining an overall packet drop probability based on the queue size and a target queue size; calculating a target class drop probability based on the overall packet drop probability and the weighting factor; comparing the target class drop probability to a selected value; and deciding whether to drop the incoming packet based on a result of the comparison.

In accordance with other aspects of the present invention, a system is provided for managing a queue and controlling loss distribution based on a service class. The system comprises class determination tools for determining a service class for an incoming packet; a packet drop controller including means for receiving an actual queue size and a target queue size, means for calculating an overall drop probability, and means for calculating a class drop probability; and a drop decision module for comparing the class drop probability to a selected value in order to determine whether to drop or queue the incoming packet.

In accordance with further aspects of the present invention, the method comprises queuing the incoming packet if the actual queue size is less than a predetermined drop threshold. If the actual queue size is greater than the predetermined drop threshold, the method comprises generating a random number and comparing the random number to the target class drop probability.

In accordance with still further aspects of the present invention, a weighting factor is selected for each service class based on a service class price.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
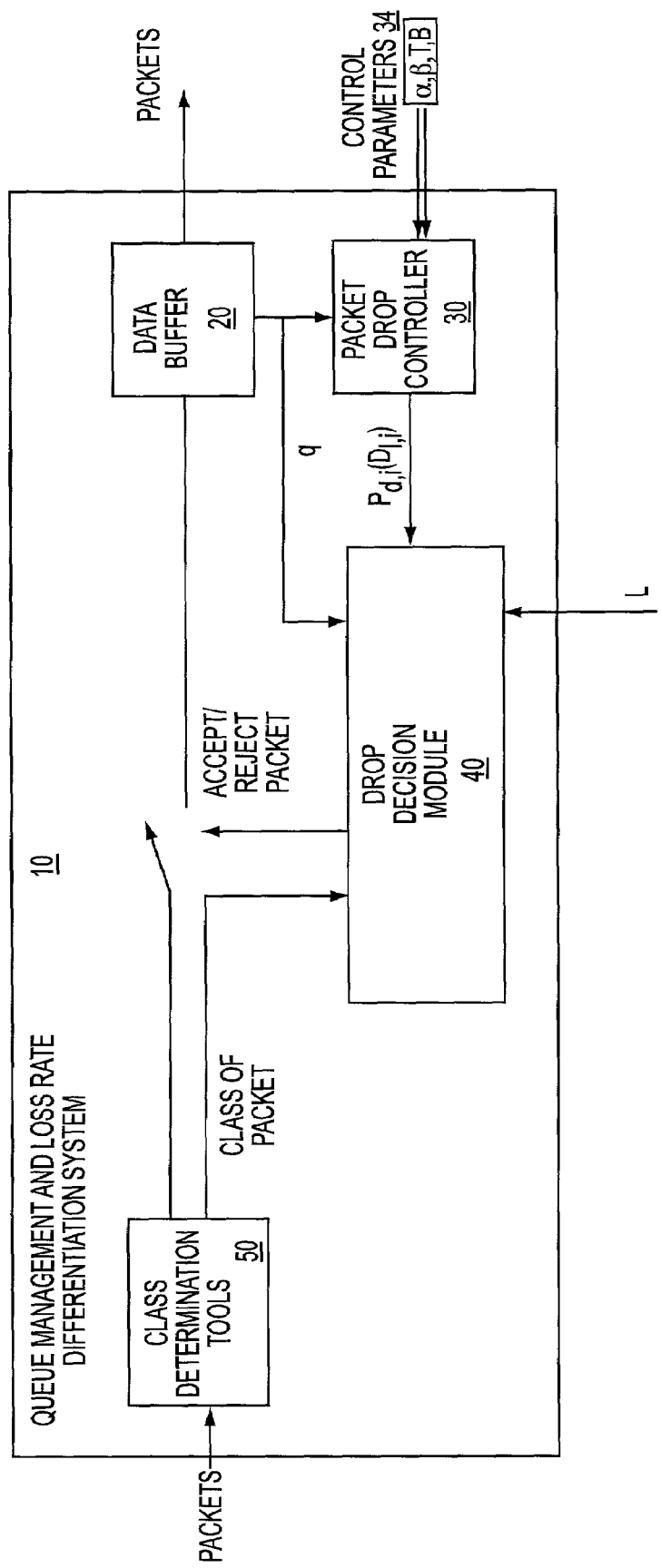
FIG. 1 is a block diagram showing a queue management and loss rate differentiation system in accordance with an embodiment of the present invention.

Referring to FIG. 1, there is shown a queue management and loss rate differentiation system 10. The queue management and loss rate differentiation system 10 preferably includes or associates with a data buffer 20 for storing data packets. Class determination tools 50 classify incoming packets into classes prior to allowing the packets to enter the data buffer 20. Each class has an associated weighting factor. A packet drop controller 30 receives selected network control data and performs calculations for forwarding to a drop decision module 40. The drop decision module 40 determines whether to drop the packet or to send the packet to the data buffer 20. The aforementioned components are described in additional detail below.

The packet drop controller 30 includes an I/O controller 31 for receiving parameters 34 such as a control gain parameters $\alpha$. The control gain parameter $\alpha$ controls the reaction speed and stability of the queue management system 10. In a preferred embodiment, the recommended value of $\alpha$ is approximately 0.00005. Another parameter 34 is a filter gain parameter $\beta$. The filter gain parameter $\beta$ controls the reaction speed of the filter. A preferred value is approximately $\beta=0.002$. An additional parameter 34 received by the packet drop controller is the control target T. T sets the average buffer utilization level and average queuing delay, since the average queue size revolves about this value. A final parameter processed by the packet drop controller 30 includes a buffer size B that is allocated to the connections or flows anticipated.

The packet drop controller 30 additionally includes drop probability calculation tools 33, which calculate an overall packet drop probability with the assistance of the error computation tools 32. The drop probability calculation tools 33 further calculate a target drop probability per class, which will be described further below in connection with the method of the invention.

The drop decision module 40 and the packet drop controller 30 receive periodic updates from the data buffer 20 regarding the aggregate load or queue size (q). Based on a queue control law which includes target parameters selected by a network operator, the packet drop controller 30 determines a packet drop probability $p_d$ which can be used to drop packets to provide feedback to the data sources to throttle their transmission rates. Finally, the packet drop controller 30 sends the desired drop probability per class to the drop decision module 40.

An I/O controller 41 receives the drop probability from the packet drop controller 30, the actual queue size q from the buffer 20, and a "no-drop" threshold L from the network operator. The "no-drop" threshold L is a threshold lower than T, below which no packets are dropped even though $p_d$ can be greater than zero. This helps to maintain high link utilization and keep the average queue size around the target level. L should always be a little lower than T, i.e., L=bT, b∈[0.8,0.9]. The recommended value is L=0.9T. Comparison tools 42 determine if the actual queue size q is below the drop threshold L. Upon the arrival of a packet if q is less than L, the drop decision module queues the packet.

Figure 3A:
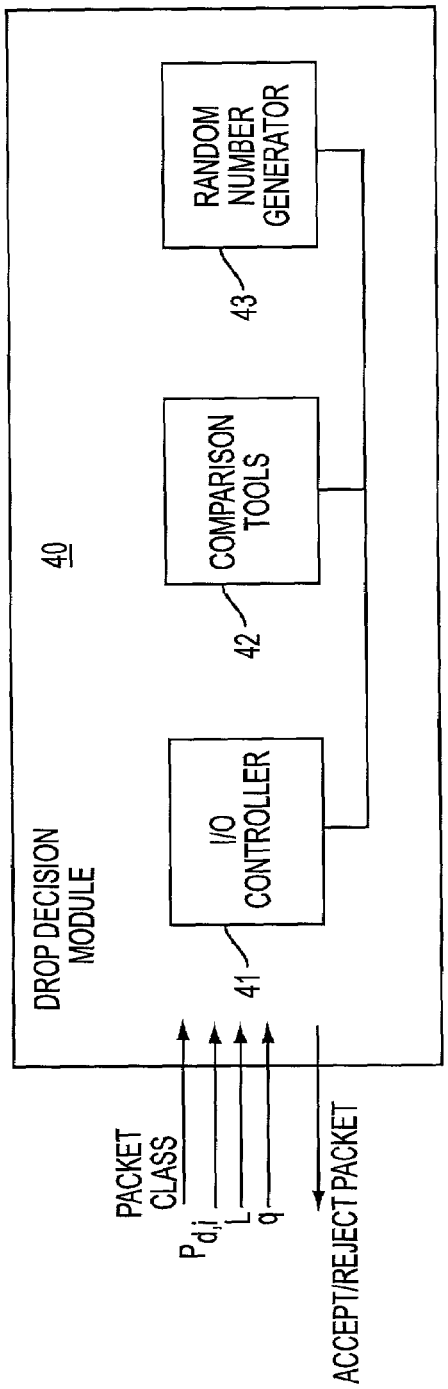
FIG. 3(A) is a block diagram showing an embodiment of a drop decision module of the system of the invention.

In the embodiment of FIG. 3(A), if q is greater than L upon the arrival of a packet a random number generator 43 generates a random number for comparison with the target class drop probability. Based on the comparison result, the drop decision module 40 determines whether to drop or queue the packet. The comparison process is described in greater detail below.

Figure 2A:
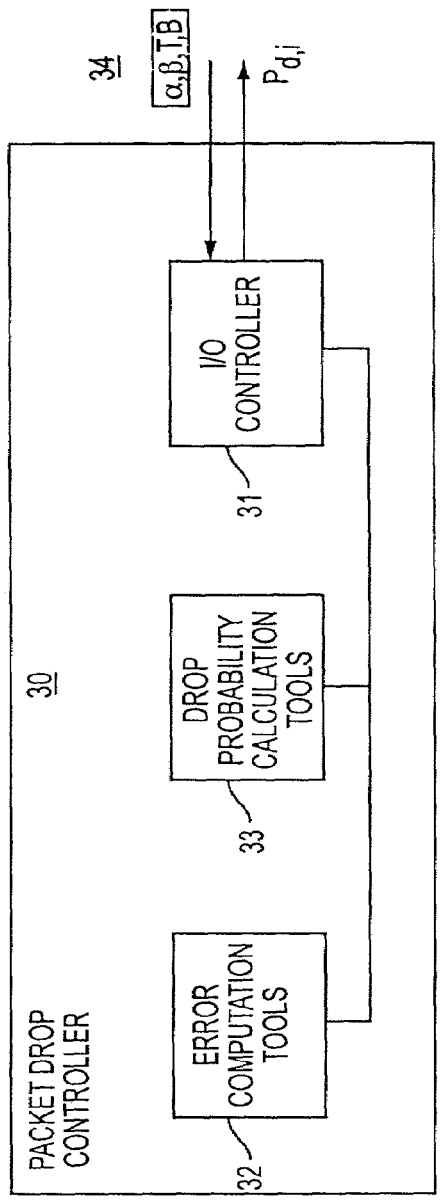
FIG. 2(A) is a block diagram showing an embodiment of a packet drop controller of the system of the invention.
Figure 2B:
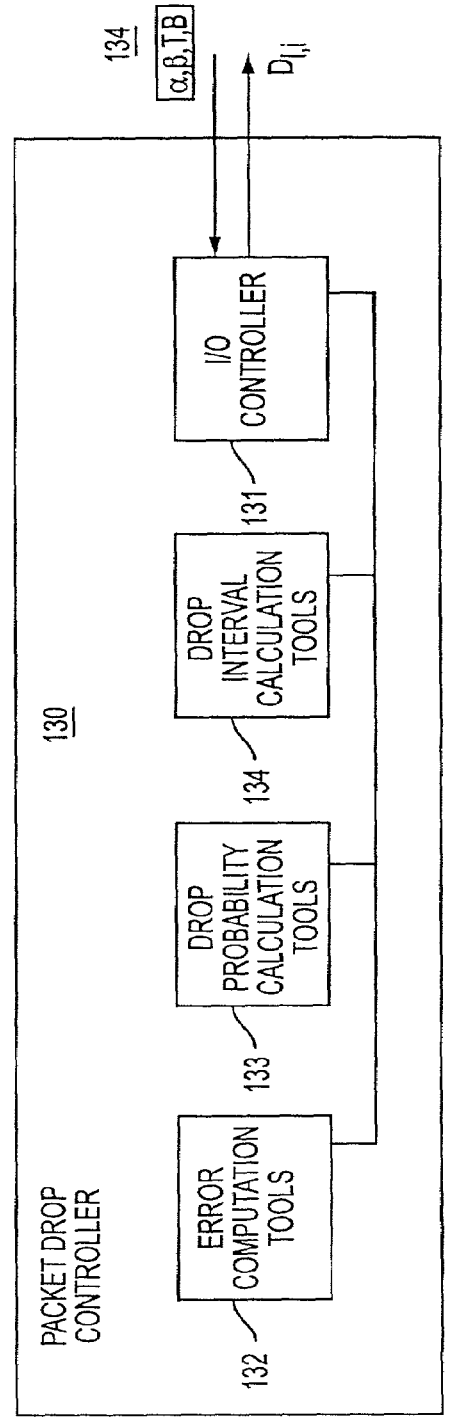
FIG. 2(B) is a block diagram illustrating an alternative embodiment of a packet drop controller.
Figure 3B:
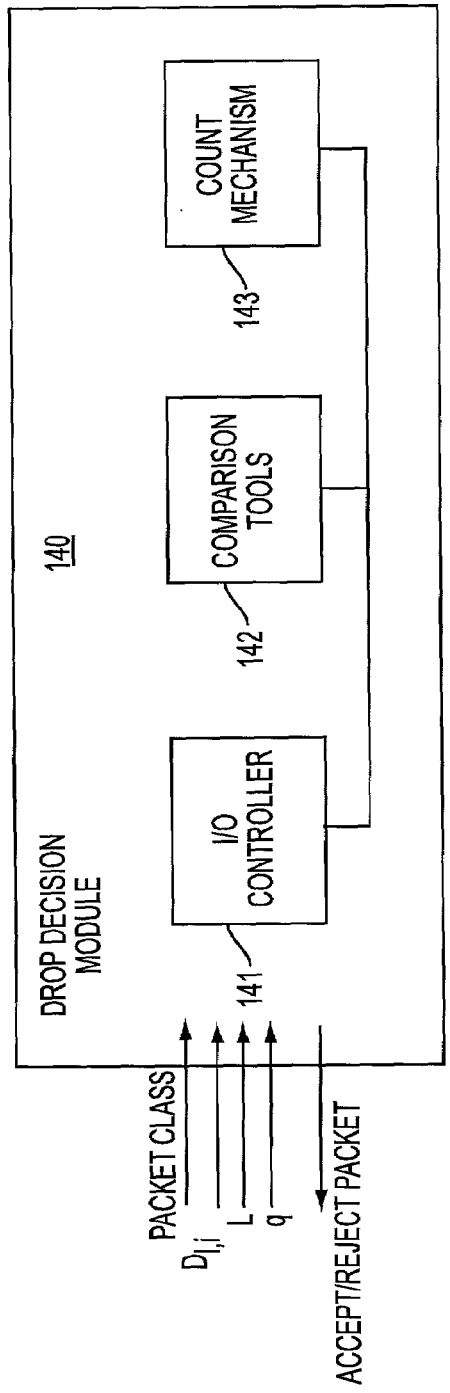
FIG. 3(B) is a block diagram showing an alternative embodiment of a drop decision module of the system of the invention.

An alternative embodiment of the invention uses a drop controller 130 as shown in FIG. 2(B) and a drop decision module 140 as shown in FIG. 3(B).

The packet drop controller 130 includes an I/O controller 131, error computation tools 132, and drop probability calculation tools 133 similar to those described above with respect to FIG. 2(A). The packet drop controller 130 further includes drop interval calculation tools 134. The drop interval calculation tools 134 include means for calculating an inter-drop interval count:

$$D_{I,i}(n)=[1/p_{d,i}(n)] \tag{2}$$

where $D_{I,i}(n)$ indicates the interval in packets until the next drop.

A drop decision module 140 shown in FIG. 3(B) includes an I/O controller 141 and comparison tools 142. A count mechanism 143 counts a number of packets arriving in each class. In addition to determining if the actual queue size is greater than a target, the comparison tools include means for determining if the count for a class is greater than, equal to, or less than an inter-drop interval $D_{I,i}$. If the count is greater than or equal to $D_{I,i}$ upon the arrival of a packet, the drop decision module 140 will drop the packet and reset the count. Otherwise, the drop decision module 140 will queue the packet.

Figure 4:
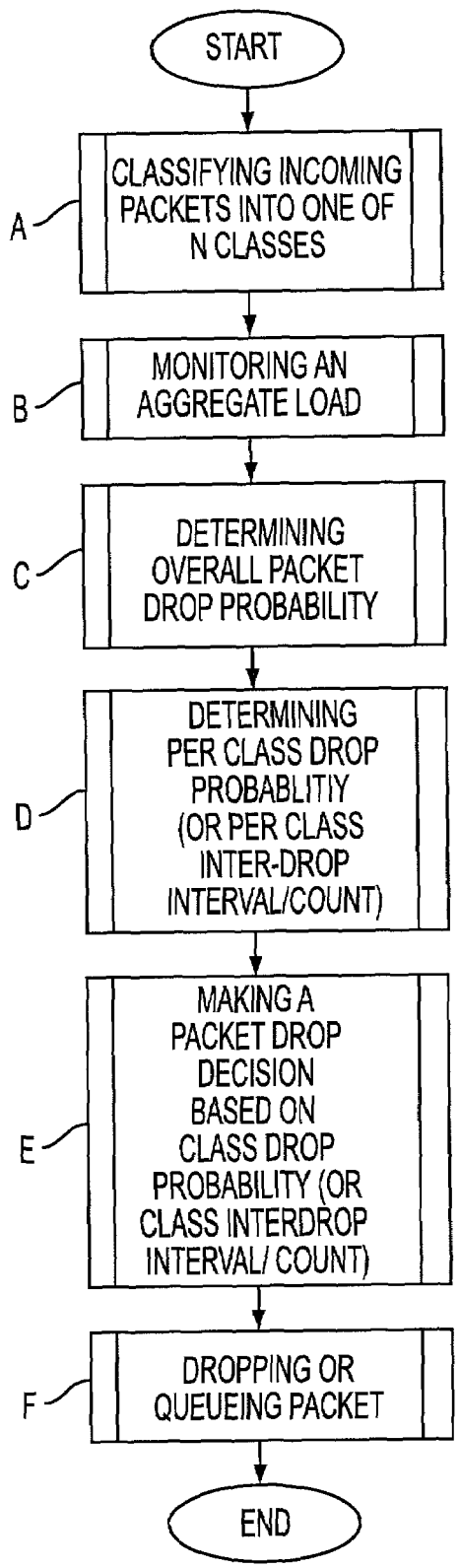
FIG. 4 is a flow chart showing a method of the invention.

As shown in FIG. 4, the method for queue management and loss distribution includes a plurality of procedures including: A) classifying incoming packets into one of N classes; B) monitoring an aggregate load; C) determining an overall packet drop probability; D) determining a target drop probability per class; E) making a packet drop decision based on a target class drop probability on inter-drop interval/count; and F) dropping or queuing the incoming packet. The details of each procedure are described in detail below.

In procedure A, the class determination tools 50 receive an incoming packet and classify it according to class specific criteria. In a preferred embodiment, incoming packets are classified into a service class based on the price of service. Accordingly, users paying different amounts of money will receive a different service quality.

In procedure B, the system 10 monitors a queue size or aggregate load in the data buffer 20. Both the drop decision module 40 and the packet drop controller 30 must periodically receive updated load information.

The actual queue size in the switch or router is assumed to be sampled every Δt units of time (seconds), and the packet drop controller provides a new value of the drop probability $p_d$ every Δt units of time. Therefore, Δt is the sampling/control interval of the system. The control system will be described in discrete time below.

Figure 5:
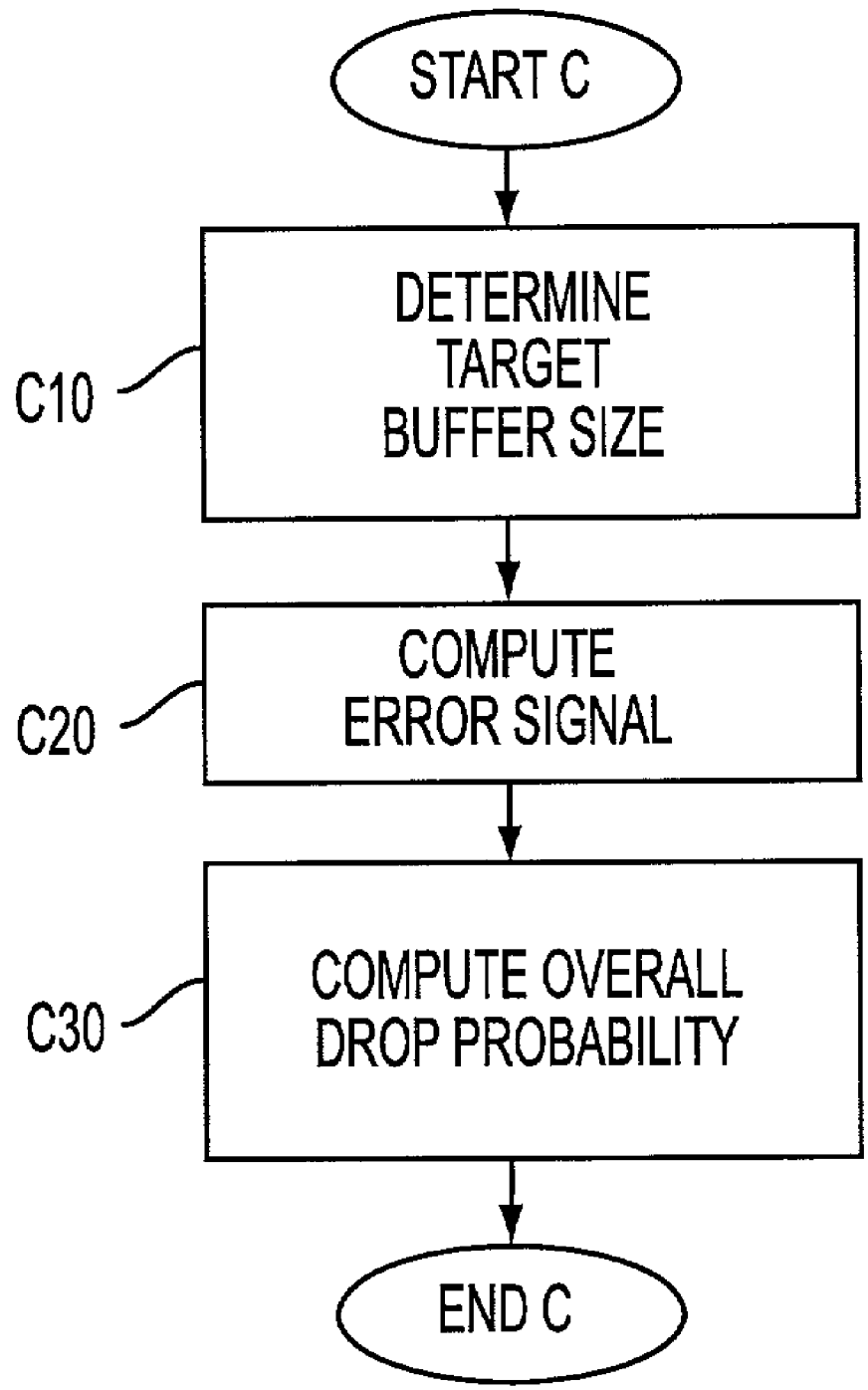
FIG. 5 is a flow chart showing the details of the procedure for determining a packet drop probability.

In procedure C, the packet drop controller 30 determines the overall packet drop probability. As shown in FIG. 5, in step C10, a network controller forwards a target buffer size to the packet drop controller 30. In step C20, the error computation tools calculate the appropriate error, and in step C30, the drop probability calculation tools 33 determine an overall drop probability. Steps C20 and C30 are described in greater detail below.

The computation of the packet drop probabilities is described in prior patent application Ser. No. 09/455,445. Briefly, the prior application describes a mechanism that uses a simple control-theoretic approach to randomly discard packets with a load-dependent probability when a buffer in a network device gets congested. The mechanism maintains the average queue size close to a predetermined threshold, but allows transient traffic bursts to be queued without unnecessary packet drops.

The packet drop algorithm is a mechanism for congestion control (e.g., controlling the queue size) at a line interface of a network device. The algorithm controls congestion by randomly dropping packets with a probability $p_d$, which constitute a signal to applications (TCP sources) to reduce their sending rate. The algorithm takes its decision of dropping or accepting an incoming packet so that the queue occupancy level is kept at a given target level, thereby eliminating buffer underflow and overflow as much as possible.

Let q(n) denote the actual queue size and T(n) the target buffer occupancy at discrete time n, where n=1Δt, 2Δt, 3Δt, . . . It is desirable to determine a drop probability $p_d$ which will drive the queue size to this target buffer occupancy. Therefore, the system adapts $p_d$ to react to the actual queue dynamics experienced at the node using a simple control mechanism: if the actual queue size q is smaller than the target queue size T, $p_d$ is decreased to make aggressive usage of the available resources, and vice versa if the actual queue size is high.

A goal of the packet drop controller 30 is therefore to adapt $p_d$ so that the magnitude of the error signal $$e(n) = q(n) - T(n) \tag{3}$$

is kept as small as possible. Due to the burstiness of the network traffic and other perturbations, this error signal is highly fluctuating, so that some low pass filtering is desirable.

The first part of the controller is a discrete-time first-order low-pass filter (an exponentially weighted moving average filter, EWMA) with gain <β<1. The filtered error signal is given by $$\hat{e}(n) = (1-\beta)\hat{e}(n-1) + \beta e(n). \tag{4}$$

A second function of the controller is then the incremental adaptation of the drop probability Pd proportional to the filtered error signal $$p_d(n) = p_d(n-1) + \alpha \hat{e}(n), \tag{5}$$

where α is a control gain. Note that $p_d(n)$ is always bounded by $0 \leq p_d(n) \leq 1$, for all n. The basic recursion $p_d(n) = p_d(n-1) + \alpha e(n)$ implements the standard summation or integral control scheme since $$\Delta p_d(n) = p_d(n) - p_d(n-1) = \alpha e(n) \text{ or } p_d(n) = \alpha \sum_{i=0}^{n} e(i),$$

in discrete-time (and $$dp_d(t)/dt = \alpha e(t) \text{ or } p_d(t) = \alpha \int_0^t e(\tau) d\tau,$$

in continuous-time).

In our control problem, the normalized error signal is used instead, resulting in the control equation $$p_d(n) = p_d(n-1) + \alpha \frac{\hat{e}(n)}{2T(n)}, \tag{6}$$

where the term 2T(n) serves only as a normalization parameter. Note also that filtering the error signal e(n) is equivalent to filtering the sampled queue size q(n) for constant T, thus, the control equation can also be expressed as $$p_d(n) = p_d(n-1) + \alpha \left[ \frac{\hat{q}(n) - T}{2T} \right], \tag{7}$$

where q̂(n) denotes the filtered queue size. Filtering of the error signal e or queue size q also has the important benefit of allowing traffic bursts to be queued without being unnecessarily discarded. This is because congestion is detected by comparing the average queue size to a pre-determined threshold. In effect, only the average queue size is controlled, allowing transient traffic bursts to be accommodated in the queue.

Figure 6A:
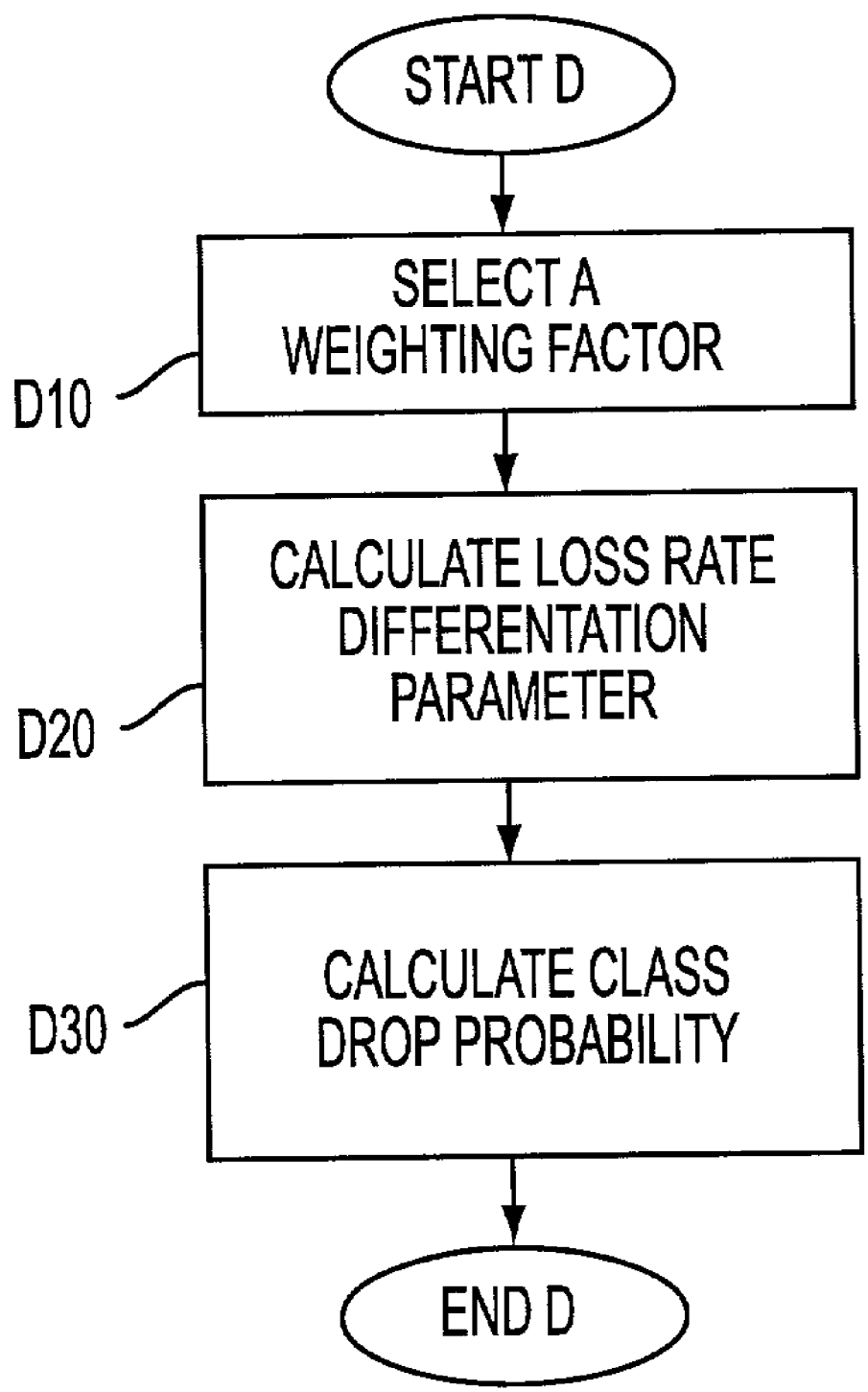
FIG. 6(A) is a flow chart showing an embodiment of a procedure for determining a class drop probability.

After determining the overall drop probability in procedure C, the drop probability calculation tools 33 calculate a target drop probability per class in procedure D as shown in FIG. 6(A). This calculation involves selection of a weighting factor in step D10, calculation of a loss rate differentiation factor in step D20, and finally, calculating a target class drop probability in step D30. The details of these steps are described in detail below. Accordingly, if packet losses are unavoidable in the system, the losses should be distributed among the different service classes in proportion to their loss rate differentiation parameters $\sigma_i$, i=1,2, . . . , N. That is, each class i should have an average drop rate of $$p_{d,i} = \frac{\sigma_i}{\sum_{j=1}^{N} \sigma_j} \cdot p_d, \quad i = 1, 2, \ldots, N. \tag{8}$$

The shared buffer is used to store the packets of N classes with different loss rates. We assume that each class i, (i=1,2, ... ,N) has a different service price or weight $p_i$, i=1,2, ... ,N, determined based on pricing or other network policy criteria.

Given the price per class p, i=1,2, ... ,N, the following loss rate differentiation parameters can be defined for each class $$\sigma_i = \frac{1}{p_i}, \quad i = 1, 2, \ldots, N. \tag{9}$$

Thus, the packet drop controller 30 calculates a target drop probability per service class of $$p_{d,i}(n) = \frac{\sigma_i}{\sum_{j=1}^{N} \sigma_j} \cdot p_d(n), \quad i = 1, 2, \ldots, N. \tag{10}$$

When a packet of class i (i=1,2, ... ,N) arrives at the queue, a determination is made as to whether the packet should be drop based on its class drop probability $p_{d,i}(n)$.

Thus, the system 10 drops packets such that the following condition will be satisfied:

$$p_{d,i}(n) = \bar{l}_i(n) = \frac{\sigma_i}{\sum_{j=1}^{N} \sigma_j} \cdot p_d(n), \quad i = 1, 2, \ldots, N \tag{11}$$

where $\bar{l}_i(n)$ is the average loss rate of class i at time n. Since $p_d$ has a maximum value of 1, each $p_{d,i}$ can attain only a maximum value of $$\max p_{d,i} = \sigma_i \Big/ \sum_{j=1}^{N} \sigma_j, \quad i = 1, 2, \ldots, N.$$

The computations of the overall packet drop probability and the target loss probabilities of each class can be summarized as follows:

At time n:

Sample queue size: q(n)

Compute current error signal using current threshold T(n):
   e(n)=q(n)−T(n)

Compute filtered error signal: $\hat{e}(n)=(1-\beta)\hat{e}(n-1)+\beta e(n)$

Compute current overall drop probability:

$$p_d(n) = \min\left\{\max\left[p_d(n-1) + \alpha \frac{\hat{e}(n)}{2T(n)}, 0\right], \theta\right\} \tag{12}$$

Upper bound on the drop probability can also be introduced by selecting the appropriate limit $\theta \leq 1$.

Compute the target loss probability per class:

$$p_{d,i}(n) = \frac{\sigma_i}{\sum_{j=1}^{N} \sigma_j} \cdot p_d(n), \quad i = 1, 2, \ldots, N \tag{10}$$

Figure 7A:
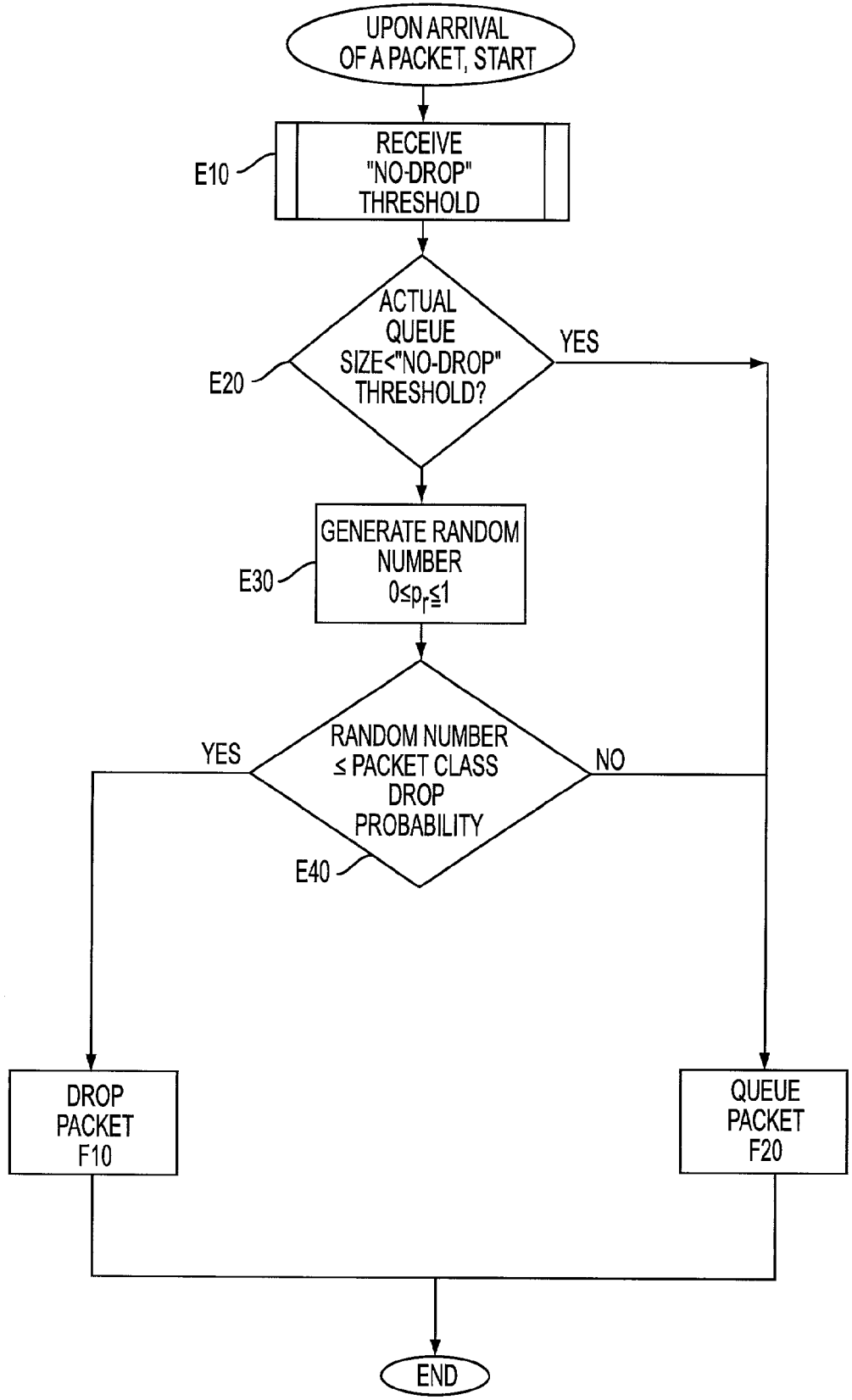
FIG. 7(A) is a flow chart showing an embodiment of the procedure for making a packet drop decision.

FIG. 7(A) shows a first embodiment of procedures E and F, which include the steps for making a packet drop decision and dropping or queuing a packet. In step E10, the drop decision module 40 receives a "no-drop" threshold "L". In step E20, the comparison tools 42 determine whether the actual queue size q is less than the threshold L. If the actual queue size q is less than the threshold L, the drop decision module 40 queues the packet in step F20. If the actual size q is greater than or equal to the threshold L, the random number generator 43 generates a random number in step E30. In step E40, the comparison tools 42 compare the random number with the target class drop probability. If the random number is less than or equal to the target class drop probability, the drop decision module drops the packet in step F10. If the random number is greater than the class drop probability, the drop decision module 40 queues the packet in step F20.

As mentioned above, the decision to accept or drop an incoming packet in the random number generator approach is mainly based on the outcome of a comparison of a randomly generated number $p_r \in [0,1]$ and the drop probability $p_{d,i}$, i=1,2, ... ,N. The "no-drop" threshold L (L<T) is introduced to the drop decision module 40 to help maintain high link utilization and keep the queue size around the target level. The drop decision module 40 does not drop packets when q(n)<L in order to maintain high resource utilization and also not to further penalize sources which are in the process of backing off in response to (previous) packet drops. Note that there is always a time lag between the time a packet is dropped and the time a source responds to the packet drop. The computation of $p_d$, however, still continues in the packet drop controller 30 even if packet dropping is suspended (when q(n)<L).

Figure 6B:
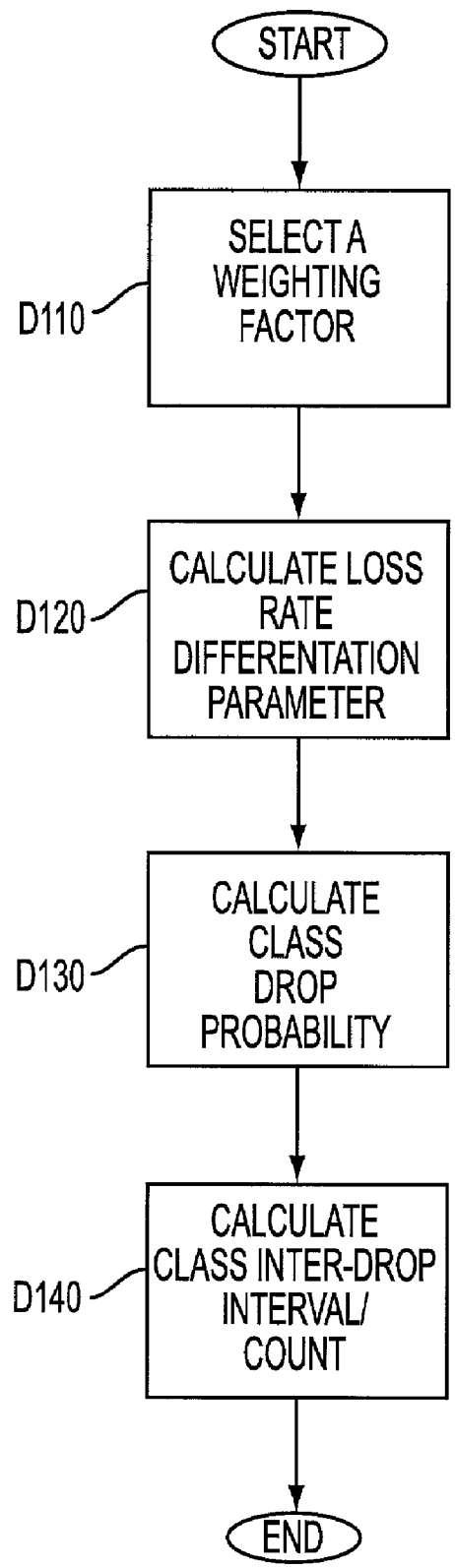
FIG. 6(B) is a flow chart showing an alternative embodiment of a procedure for determining a class drop probability.
Figure 7B:
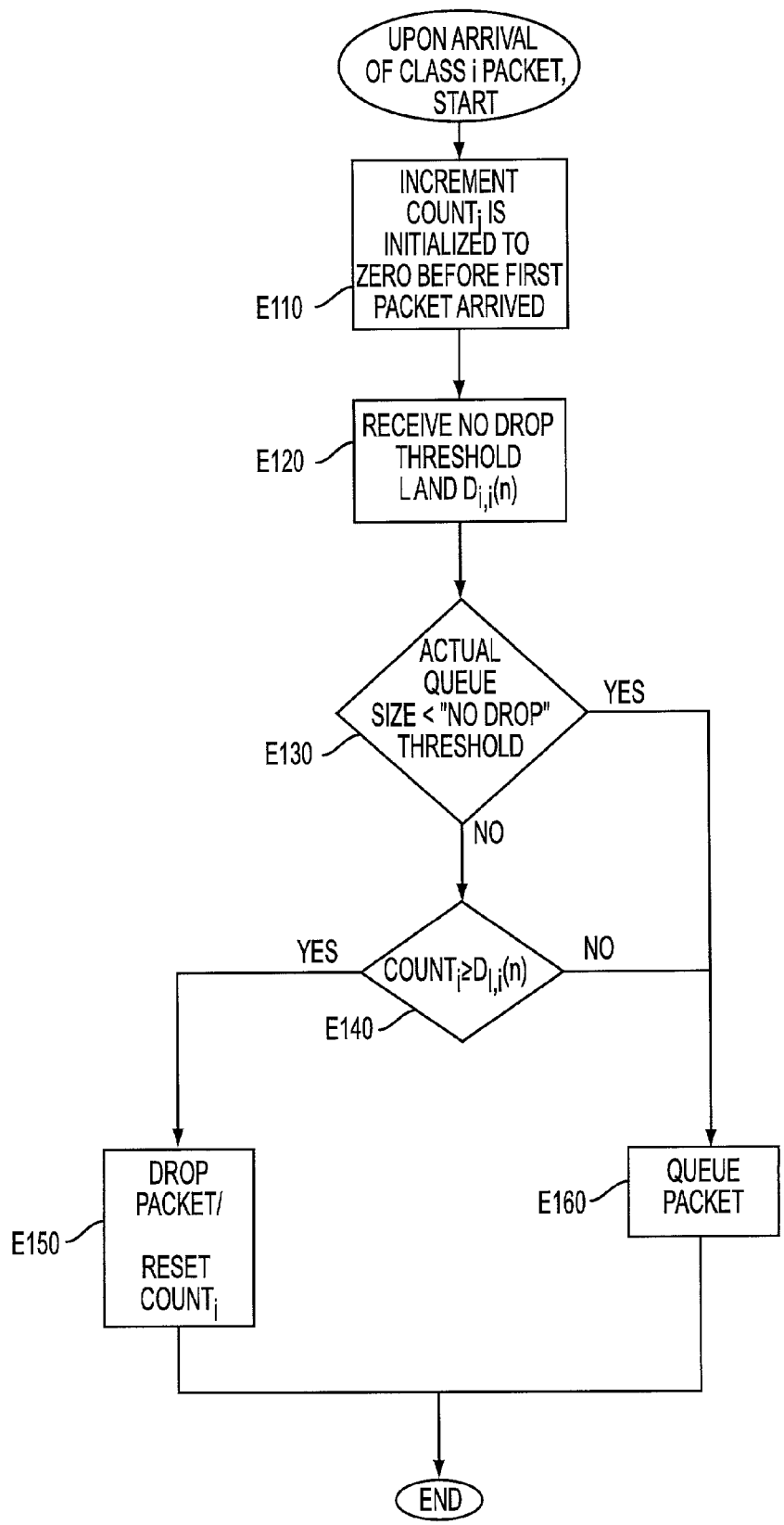
FIG. 7(B) is a flow chart showing an alternative embodiment of the procedure for making a packet drop decision.

FIGS. 6(B) and 7(B) illustrate the method carried out by the systems shown in FIGS. 2(B) and 3(B). FIG. 6(B) shows steps D110, D120, and D130, which are substantially similar to steps D10, D20, and D30 of FIG. 6(A). FIG. 6(B) additionally includes step D140 of calculating an inter-drop interval/count. As stated above, the inter-drop interval/count $D_{I,i}(n)$ indicates the interval/count $D_{I,i}(n)=[1/p_{d,i}(n)]$. $D_{I,i}(n)$ indicates the interval in packets until the next packet drop. In other words, one out of every $D_{I,i}(n)$ packets should be dropped.

FIG. 7(B) illustrates the actions of the drop decision module 140. In step E110, after the packet of class i is received, the count mechanism 143 increments the count, count i. As described above with regard to FIG. 7(A), the drop decision module 140 receives parameters such as the "no-drop" threshold and the inter-drop interval count in step E120. The comparison tools 143 compare the "no-drop" threshold to the actual queue size in step E130. If the actual queue size is less than the threshold, the packet is queued in step E160. Otherwise, the comparison mechanism 143 compares the count to the inter-drop interval count $D_{I,i}(n)$ in step E140. If the count is less than $D_{I,i}(n)$, the drop decision module 140 queues the packet in step E160. Otherwise, the drop decision module 140 drops the packet and resets the count in step E150.

Thus, a simple implementation of a drop mechanism consists of the following:

For each class i, I=1,2, . . . ,N, initialize count: $count_i=0$
For each class i packet arrival:
  increment $count_i$
  if q<L, then queue the incoming packet
  else, if $count_i \geq D_{I,i}$, then drop the incoming packet and reset $count_i=0$
  else queue the incoming packet Unlike prior approaches, the system 10 couples the active queue management principle, which refers to when should a packet drop occur, to the loss rate differentiation principle, which refers to selection of a class from which a packet should be dropped.

The proposed proportional loss rate differentiation mechanism uses a simple control-theoretic approach to randomly discard packets with a load-dependent probability when a buffer in a network device gets congested. The main attribute of the mechanism is that, if packet losses are unavoidable in the system, then they should be distributed among the different service classes in inverse proportion to the service price of each class.

Relative service differentiation involves service models that provide assurances for the relative quality ordering between classes, rather than for the actual service level in each class.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

What is claimed is:

1. A method for managing a queue to control loss distribution based on service class, the method comprising the steps of:
   classifying an incoming packet into one of a plurality of classes, each class having an associated weighting factor;
   monitoring a queue size;
   determining an overall packet drop probability based on the queue size and a target queue size;
   calculating a target class drop probability based on the overall packet drop probability and the weighting factor;
   comparing the monitored queue size to a selected threshold;
   queuing the incoming packet if the monitored queue size is smaller than the selected threshold;
   making a comparison based on the target class drop probability and a selected comparison value if the monitored queue size is not less than the selected threshold; and
   deciding whether to drop the incoming packet based on a result of the comparison.

2. The method of claim 1, wherein the step of determining the overall drop probability further comprises calculating an overall drop probability that will drive the actual queue size to the target queue size.

3. The method of claim 2, wherein the step of determining the overall drop probability comprises decreasing the overall drop probability if the actual queue size is smaller than the target queue size and increasing the overall drop probability if the actual queue size is greater than the target queue size.

4. The method of claim 1, wherein the step of monitoring the queue size comprises sampling the queue size at regular intervals.

5. The method of claim 1, wherein the weighting factor represents a price per service class.

6. The method of claim 1, further comprising the step of generating a random number for use as the comparison value.

7. The method of claim 1, further comprising the step of calculating an inter-drop interval/count as a reciprocal of the target class drop probability.

8. The method of claim 7, further comprising the step of counting incoming packets from each class to obtain a class count, wherein the step of deciding whether to drop the incoming packet is based on a comparison between the inter-drop interval/count and the class count.

9. The method of claim 6, further comprising the step of comparing the generated random number to the calculated target class drop probability and queuing the packet if the random number is greater than the target class drop probability and dropping the packet if the random number is less than or equal to the calculated target class drop probability.

10. A system for managing a queue and controlling loss distribution based on a service class, the system comprising:
    class determination tools for determining a service class for an incoming packet;
    a packet drop controller including means for receiving an actual queue size and a target queue size, means for calculating an overall drop probability, and means for calculating a target class drop probability; and
    a drop decision module for deciding whether to drop the incoming packet based on a selected drop threshold and for making a comparison based on the target class drop probability and a selected comparison value in order to determine whether to drop or queue the incoming packet.

11. The system of claim 10, wherein the overall drop probability calculation means comprise means for calculating all overall drop probability that will drive the actual queue size to the target queue size.

12. The system of claim 11, wherein the overall drop probability calculation means comprise means for decreasing the overall drop probability if the actual queue size is smaller than the target queue size and increasing the overall drop probability if the actual queue size is greater than the target queue size.

13. The system of claim 10, wherein the means for receiving an actual queue size comprise means for sampling the actual queue size at regular intervals.

14. The system of claim 10, wherein each service class comprises a weighting factor representing a price per service class.

15. The system of claim 14, wherein the means for calculating the target class drop probability calculates the target class drop probability based on the weighting factor.

16. The system of claim 10, wherein the drop decision module comprises means for maintaining a count of incoming packets belonging to each class.

17. The system of claim 16, wherein the packet drop controller comprises means for calculating an inter-drop interval/count, the inter-drop interval/count being a reciprocal of the target class drop probability.

18. The system of claim 17, wherein the drop decision module comprises means for comparing the count of incoming packets to the inter-drop interval/count and making a drop decision based on the comparison.

19. The system of claim 10, wherein the drop decision module further comprises a random number generator for generating a random number if the actual queue size is greater than the selected drop threshold.

20. The system of claim 19, wherein the drop decision module further comprises comparison tools for comparing the generated random number to the calculated target class drop probability and means for queuing the packet if the random number is greater than the target class drop probability and dropping the packet if the random number is less than or equal to the calculated target class drop probability.

21. An article of manufacture for managing a queue to control loss distribution based on service class, the article of manufacture comprising:
    at least one processor readable carrier; and
    instructions carried on the at least one carrier;
    wherein the instructions are configured to be readable from the at least one carrier by at least one processor and thereby cause the at least one processor to perform the steps of:
    classifying an incoming packet into one of a plurality of classes, each class having an associated weighting factor;
    monitoring a queue size;
    determining an overall packet drop probability based on the queue size and a target queue size;
    calculating a target class drop probability based on the overall packet drop probability and the weighting factor;
    making a comparison based on the target class drop probability and a selected value; and
    deciding whether to drop the incoming packet based on a result of the comparison.

22. A signal embodied in a carrier wave and representing sequences of instructions which, when executed by at least one processor, cause the at least one processor to control loss distribution based on service class by performing the steps of:
    classifying an incoming packet into one of a plurality of classes, each class having an associated weighting factor;
    monitoring an actual queue size;
    determining an overall packet drop probability based on the actual queue size and a target queue size;
    calculating a target class drop probability based on the overall packet drop probability and the weighting factor;
    making a comparison based on the target class drop probability and a selected value; and
    deciding whether to drop the incoming packet based on a result of the comparison.

* * * * *